United States Patent [19]
Edwards

[11] 4,006,593
[45] Feb. 8, 1977

[54] MASTER CYLINDER ASSEMBLY FOR A VEHICLE HYDRAULIC BRAKING SYSTEM

[75] Inventor: Roy Ernest Edwards, West Midlands, England

[73] Assignee: Girling Limited, Birmingham, England

[22] Filed: June 5, 1975

[21] Appl. No.: 584,045

[30] Foreign Application Priority Data

June 8, 1974 United Kingdom ............ 25543/74

[52] U.S. Cl. .................................................. 60/581
[51] Int. Cl.[2] ........................................... F15B 7/08
[58] Field of Search ................ 60/581; 137/625.27, 137/625.66

[56] References Cited

UNITED STATES PATENTS

| | | | |
|---|---|---|---|
| 3,370,426 | 2/1968 | Fay | 60/581 |
| 3,486,337 | 12/1969 | Tenniswood | 60/581 X |
| 3,520,577 | 7/1970 | Moyes | 60/581 X |
| 3,568,441 | 3/1971 | Walker | 60/581 |
| 3,885,391 | 5/1975 | Campbell | 60/581 |

*Primary Examiner*—Edgar W. Geoghegan
*Attorney, Agent, or Firm*—Scrivener, Parker, Scrivener and Clarke

[57] ABSTRACT

In a dual hydraulic master cylinder assembly both pressure spaces are connected by a transfer passage incorporating a transfer valve which is open when both master cylinders are operated simultaneously, and the transfer valve comprises an unsprung valve member for engagement with one of a pair of spaced valve seatings to cut-off communication between the pressure spaces when one master cylinder is operated on its own.

5 Claims, 4 Drawing Figures

MASTER CYLINDER ASSEMBLY FOR A VEHICLE HYDRAULIC BRAKING SYSTEM

SPECIFIC DESCRIPTION

This invention relates to master cylinder assemblies for vehicle hydraulic braking systems of the kind in which separate master cylinders are connected by a transfer passage through which pressure spaces in the cylinder are in communication when the master cylinders are operated simultaneously and communication between the pressure spaces is adapted to be cut-off by transfer valve means when a master cylinder is operated on its own.

In one known master cylinder assembly of the kind set forth the transfer valve means comprises normally closed spring loaded one-way valves, each controlling communication between the transfer passage and a master cylinder, and the transfer valves are adapted to be opened by axial movement of pistons of the master cylinders in a brake applying direction. Thus, in an inoperative position, the one-way valves are closed so that the pressure spaces are isolated from the transfer passage.

A disadvantage of this arrangement is that when the master cylinder assembly is mounted near the engine of a vehicle fluid trapped in the transfer passage may expand with increase in temperature against the normally closed valves and cause a burst.

A further disadvantage is that when one master cylinder is operated on its own, the normally closed one-way valve for the opposite end of the transfer passage may open, for example upon failure of its spring, with the result that the pressure from the pressure space of the said one master cylinder will be dissipated through the transfer passage and the other master cylinder.

According to our invention, in a master cylinder assembly of the kind set forth for a vehicle hydraulic braking system the transfer valve means is located in the transfer passage and comprises an unsprung valve member adapted to be urged into engagement with one of a pair of spaced valve seatings to cut-off communication between the pressure spaces when one master cylinder is operated on its own, and the unsprung valve member is adapted to be held in a neutral position spaced from both seatings when the master cylinders are operated simultaneously.

Since the valve member is unsprung there are no springs to fail or otherwise impede effective operation of the master cylinder assembly.

Thus the pressure spaces are positively isolated from each other when one master cylinder is operated.

The valve unsprung member is positively guided for movement between the seatings in a valve guide, and a flow path is defined between the valve member and the guide so that the pressure spaces are in communication when the master cylinders are in inoperative positions and the pistons are retracted.

The unsprung valve member may comprise a ball urged towards the seatings by thrust members upon which the pistons of the master cylinders are adapted to act. In such a construction the thrust members may comprise balls of smaller diameter than the valve member.

Alternatively the unsprung valve member may have the configuration of a double ended cone, with the pistons being engageable with the ends of the cone to hold shoulders defining valve heads away from the seatings when both master cylinders are operated simultaneously.

One embodiment of our invention is illustrated in the accompanying drawings in which.

Figure 1:
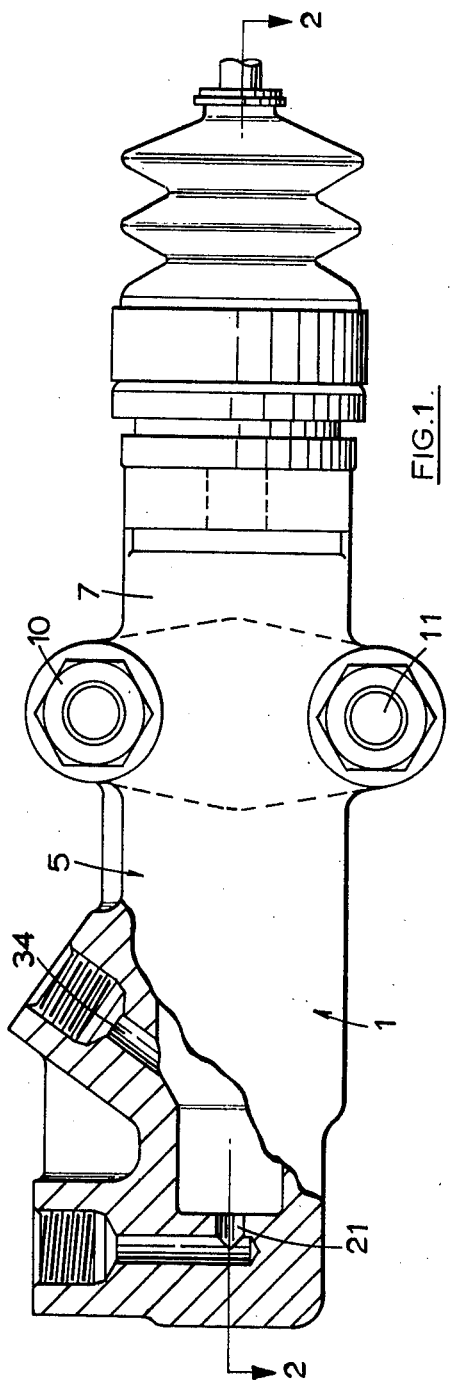
FIG. 1 is a part sectional side elevation of a dual hydraulic master cylinder assembly.
Figure 2:
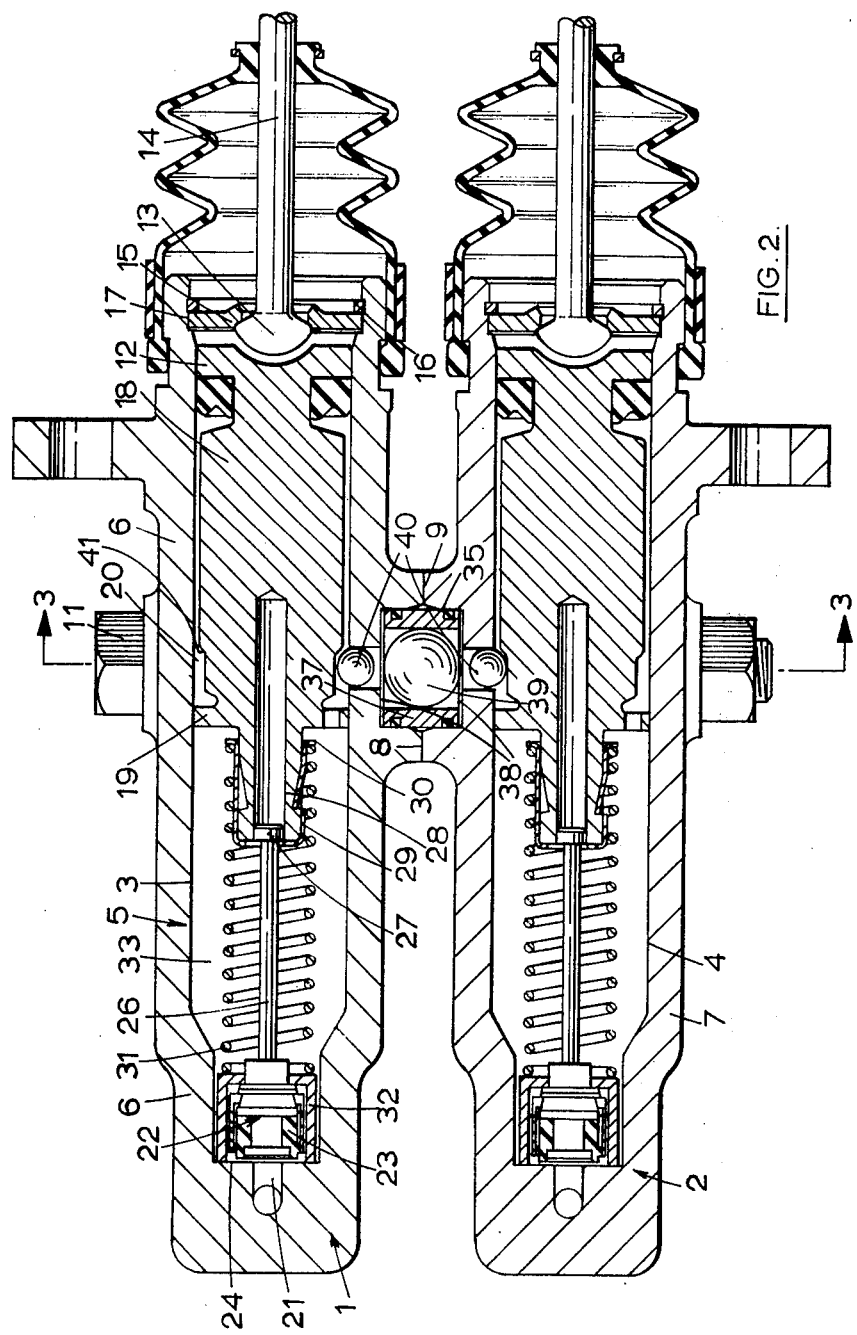
FIG. 2 is a longitudinal section on the line 2—2 of FIG. 1.
Figure 3:
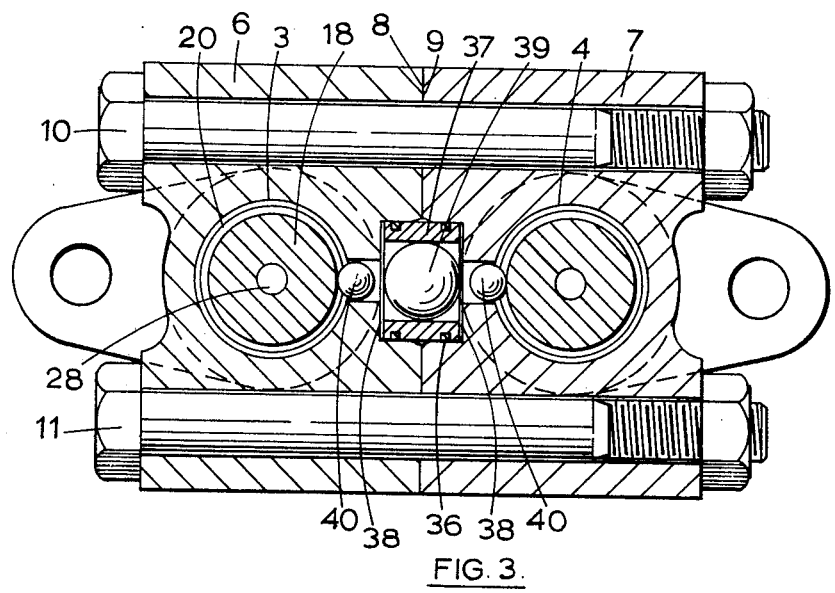
FIG. 3 is a transverse section on the line 3—3 of FIG. 2.

The dual hydraulic master cylinder assembly illustrated in the drawings comprises two master cylinders 1, 2 formed by parallel bores 3, 4 in a common housing 5. The housing 5 comprises two separate identical bodies 6 and 7 each provided with one of the bores 3, 4 and which are clamped together with longitudinally extending mating faces 8, 9 in engagement by means of transverse bolts 10, 11.

As the two master cylinders are identical in construction, only one need be described.

A piston 12 working in the bore 3 is engaged at its rear end by a part spherical head 13 on a pedal-operated push-rod 14. A stop for the head 13 is formed by an annular collar 15 located by a spring ring or circlip 16 received in an annular groove 17 in the bore 3.

The piston 12 is provided with a forward extension 18 of reduced diameter formed adjacent to its inner free end with an apertured flange 19 working in the bore 3. An annular recess 20 is located in the extension 18 to the rear of the flange 19.

A recuperation port 21 at the forward end of the body 6 for connection to a reservoir for hydraulic fluid is controlled by a recuperation valve 22 comprising a head 23 for engagement with a seating 24 surrounding the port 21. The head 23 is carried by the forward end of an axially extending stem or rod 26 of which the opposite end carries an enlarged head 27 guided to slide in a longitudinally extending bore 28 in the adjacent end of the extension 28. The head 27 is retained within the bore 28 by an apertured thimble 29 fitted over the forward end of the extension 18 and provided with a radial flange 30 forming an abutment for one end of a compression return spring 31 of which the opposite end acts on a cage 32 in which the head 23 is housed. In the position shown in the drawings the spring 31 urges the piston 12 into a retracted position in engagement with the collar 15 with the head 23 spaced from the seating 24 by the engagement of the thimble with the head 27.

A pressure space 33 defined in the bore in front of the piston 12 is adapted to be connected to a vehicle brake through an outlet port 34. Normally the pressure space of one master cylinder will be connected to brakes on one side of a vehicle, for example an agricultural tractor, and the pressure space of the other master cylinder will be connected to brakes on the opposite side of the tractor. Thus both master cylinders will be operated simultaneously to retard the vehicle, and independently for steering.

The pressure spaces 33 are interconnected by a transfer passage 35 defined by superimposed complementary stepped bores 36 in the mating portions of the walls of the bodies 3 and 4. The larger diameter portions of the stepped bores 36, which are adjacent to each other, receive a sealed sleeve 37 abutting at opposite ends against shoulders 38 at the steps in diameter in the bores 36. The shoulders 38 define spaced seatings with which a spherical unsprung valve member 39 guided within the sleeve 37 is adapted to engage alternatively. A leak path (not shown) is provided between the sleeve 37 and the valve member 39.

A thrust member 40 in the form of a ball is guided in the portion of each bore 36 which is of smaller diameter and in the retracted position illustrated each thrust member 40 is received in the recess 20 in the adjacent extension 18.

When the master cylinder is operated, a short forward movement of the piston 12 with corresponding compression of the spring 31 is sufficient to cause the head 23 to engage with the seating 24 to isolate the reservoir from the pressure space 33. Simultaneously, or almost immediately thereafter, the piston 12 also urges the thrust member 40 inwardly by the engagement therewith of an inclined annular face 41 at the end of the recess 20 remote from the flange 19. This movement urges the valve member 39 away from the adjacent seating 38 in that body 6 but towards the other seating. Further movement of the piston 12 in the same direction causes fluid to flow through the transfer passage via the leak path around the valve member 39 which, in turn, creates a pressure drop across the member 39 and urges it positively into engagement with the seating 38 in the body 7 thereby isolating the master cylinders 1 and 2 from each other.

When the master cylinders are operated simultaneously the thrust members 40 act in opposite directions to hold the valve member 39 in a neutral position, spaced from both seatings 38, so that the pressure spaces are in free communication through the transfer passage to compensate for differential wear of the linings of the brakes which the master cylinders operate.

In the inoperative retracted position the pressure spaces 33 are in free communication through the transfer passage 35 so that any build-up of pressure in the brake lines due to thermal expansion of the fluid is immediately dissipated to reservoir through the recuperation ports.

Figure 4:
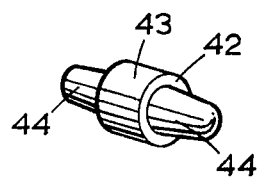
FIG. 4 is a valve and the thrust member in the form of a double ended cone.

In a modification the valve member 39 and the thrust members 40 may be combined into a single member in the form of a double ended cone illustrated in FIG. 4. In such a construction shoulders 42 between a central cylindrical portion 43 and end portions 44 of conical outline define valve heads for alternate engagement with the seatings 38.

I claim:

1. A master cylinder assembly for a vehicle hydraulic braking system comprising a pair of master cylinders, each comprising a cylinder, and a piston working in said cylinder and movable between a retracted position and an advanced position in advance of said retracted position and in which hydraulic fluid in a pressure space in said cylinder in advance of said piston is pressurised, and said master cylinder assembly incorporates a fluid flow transfer passage connecting said pressure spaces and through which said pressure spaces communicate when both said master cylinders are operated simultaneously, and transfer valve means are located in said transfer passage to cut-off communication between said pressure spaces when one of said master cylinders is operated on its own, wherein said transfer valve means comprises an unsprung valve member, and a pair of spaced seatings with one of which said valve member is engageable to cut-off communication between said pressure spaces when one of said master cylinders is operated on its own, and means are provided for holding said unsprung valve member in a neutral position spaced from both said seatings when both said master cylinders are operated simultaneously.

2. A master cylinder assembly as claimed in claim 1, incorporating a valve guide in which said unsprung valve member is positively guided for movement between said seatings, and a flow path is defined between said valve member and said guide so that said pressure spaces are in communication when said master cylinders are in inoperative positions with said pistons in said retracted positions.

3. A master cylinder as claimed in claim 1, wherein said unsprung valve member comprises a ball, and thrust members upon which said pistons are adapted to act are adapted to urge said ball away from said seating.

4. A master cylinder assembly as claimed in claim 3, wherein said thrust members comprise balls of smaller diameter than said valve member.

5. A master cylinder assembly as claimed in claim 1, wherein said unsprung valve member has the configuration of a cone having double ends, and shoulders on said cone define spaced valve heads for engagement with said seatings, said pistons being engageable with said ends to hold said valve heads away from said seatings when both said master cylinders are operated simultaneously.

* * * * *